United States Patent [19]

Lala et al.

[11] Patent Number: 4,665,522

[45] Date of Patent: May 12, 1987

[54] MULTI-CHANNEL REDUNDANT PROCESSING SYSTEMS

[75] Inventors: Jaynarayan H. Lala, Natick; Larry D. Brock, Lexington, both of Mass.

[73] Assignee: The Charles Stark Draper Laboratory, Inc., Cambridge, Mass.

[21] Appl. No.: 695,636

[22] Filed: Jan. 28, 1985

[51] Int. Cl.$^4$ ............................................. G06F 11/18
[52] U.S. Cl. ........................................ 371/36; 371/68
[58] Field of Search ................... 371/36, 68; 364/200, 364/900; 307/464, 279, 269

[56] References Cited

U.S. PATENT DOCUMENTS

| | | |
|---|---|---|
| 4,225,961 | 9/1980 | Raggenbass ............................ 371/36 |
| 4,270,715 | 6/1981 | Norton .................................. 371/36 |
| 4,375,683 | 3/1983 | Wensley ................................ 371/36 |
| 4,400,792 | 8/1983 | Strelow ................................. 371/68 |
| 4,484,330 | 11/1984 | Moy ..................................... 371/36 |
| 4,497,059 | 1/1985 | Smith ................................... 371/36 |

Primary Examiner—Michael R. Fleming
Attorney, Agent, or Firm—Robert F. O'Connell

[57] ABSTRACT

A multi-channel redundant processing system having tightly synchronized redundant processor channels wherein one or more additional processors are connected to each of the redundant channels, the redundant outputs being supplied to such additional processors to permit different processing operations to be performed on such redundant outputs. A selected number of added processors can perform the same processing operations and the processed outputs can be supplied to the redundant processor channels to establish a selected degree of reliability while one or more other added processors can be used to perform other processing operations on the redundant outputs in a non-redundant manner. Further, such added processors can be used to detect software programs fault situations in which multiple versions of software programs are used.

10 Claims, 3 Drawing Figures

MULTI-CHANNEL REDUNDANT PROCESSING SYSTEMS

BACKGROUND OF THE INVENTION

1. Field Of The Invention

This invention relates generally to redundant processing systems and, more particularly, to a multi-channel redundant processor system which is readily adaptable for use with multiple processors connected thereto.

2. Description Of The Related Art

Multi-channel redundant processing systems have been proposed by the art utilizing either synchronous or asynchronous operation among the redundant channels. One effective multi-channel process system is described in U.S. patent application Ser. No. 372,734, filed on Apr. 28, 1982, now, U.S. Pat. No. 4,497,059 by T. Basil Smith, which system utilizes a tightly synchronous operation, as explained therein, wherein all channels operate equally (i.e., without the need to arrange a master/slave relationship among them). All channels are capable of receiving data information, for example, which information is mutually exchanged, or distributed, among all the channels and transmitted to suitable voter circuitry in each channel so as to provide a voted output in each channel based on the distributed information. The voted outputs from all unfailed channels are identical and the voted output from a failed channel will be different from that of the unfailed channels. Such redundant system as a whole is assured that all identical voted outputs represent information which is the desired correct information and is further assured that failed channels thereby can be suitably identified.

Because the channels are all operating in a tightly synchronized manner, signals can be transferred among the channels in a simple manner without the complex circuitry necessary when using asynchronous operation, for example, or when using some intermediate form of loosely synchronized operation. The approach described therein can be extended to any number of redundant channels to provide the desired operation.

The approach described therein tends to be limited, however, to the computing power of the processors from which it is constructed. If data processing requirements exceed the redundant processor capability, different processors must then be utilized and the system redesigned therefor. In some cases processors with sufficient processing capability may not be available.

While it may be possible to solve the problem of processing power requirements by providing increased processing power merely by implementing multi-processor fault-tolerant systems, such approach involves considerable processing overhead and channel interconnection complexity. Such an approach is particularly inefficient when multiple software versions of the same functions are implemented to protect from software errors. In the latter situation the total processing burden will be the product of the hardware redundancy level (R) and the number of versions (N) of the software used.

It is desirable, therefore, to improve the flexibility of such a tightly synchronized redundant system by allowing processing power to be added in an incremental fashion. Such concept can be particularly effective for executing multiple versions of software wherein the total processing burden will be less than the product of the hardware redundancy level and the number of versions of software used.

BRIEF SUMMARY OF THE INVENTION

In accordance with the invention a system is proposed for adding incremental processing power to a basic fault-tolerant, multi-channel redundant system such as that of the type described in the aforesaid Smith application, for example, and in which it is possible to execute N-versions of software where the processing burden is more closely proportional to the sum of the hardware redundancy level and the number of software versions rather than the product thereof.

In accordance therewith, when a particular application of the unique redundant processor system of the tightly synchronized type, for example, requires more processing capability than is available in the core processors, one or more additional processors can be connected to each of the core fault-tolerant processors. Such attached processors are arranged to be usable for both pure data processing or for interface processing for external signals, i.e., input/output (I/O) processors. Such one or more added processors can be connected to the basic system via dual-ported memories. The basic or core processors exercise executive control of the system and initiate tasks in the one or more attached processors thereby providing the necessary inputs from the core data base and accepting the outputs from the attached processors. Multiple attached processors can be used to perform real time critical and essential functions and the outputs from such tasks are voted within the core processors to provide the appropriate masking, detection and identification of faults, in a manner similar to that described in the aforesaid Smith application.

Moreover, the overall system of the invention includes the efficient implementation of multiple versions (e.g., N versions) of critical software programs in which the core processors initiate tasks in different ones of the attached processors that perform the same basic operations but which are independently developed to avoid common implementation design errors. The results from such N versions of software are voted in the core processors to mask, detect and identify faults and, if there is a fault, it is immediately masked, thereby allowing the system to continue all its critical functions. Such an approach permits the testing of the multiple versions of such software in a manner such that the processing burden is effectively proportional to the sum of the hardware redundancy level and the number of software versions used.

BRIEF DESCRIPTION OF THE DRAWINGS

The invention can be described in more detail with the help of the accompanying drawings wherein.

DESCRIPTION OF THE PREFERRED EMBODIMENTS

Figure 1:
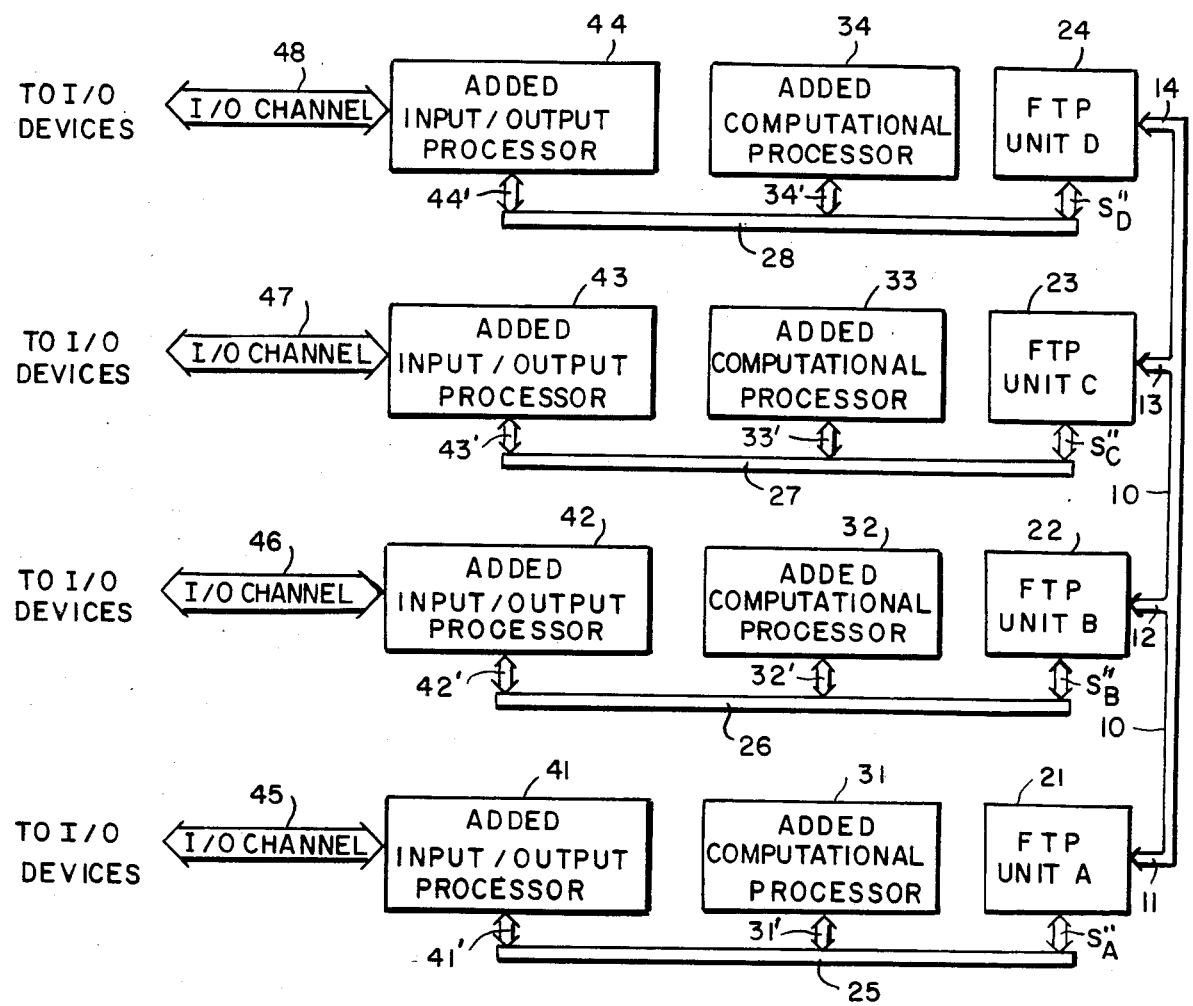
FIG. 1 shows a block diagram of a tightly synchronous redundant processing system using one or more added processors attached thereto in accordance with the invention.

As can be seen in FIG. 1 a plurality of redundant fault-tolerant processor channels 21, 22, 23, 24 are utilized for the purpose of receiving appropriate input data and providing appropriate output data therefrom. For convenience four such fault-tolerant processor channels are depicted, the input data being received from suitable sensors (not shown) via the I/O channels 45–48, the I/O processors 41–44 and buses 25–28. The data from the sensors are then exchanged among the processor channels 21–24 via bus 10 the channel input buses 11, 12, 13 and 14. Each of the fault-tolerant processors receives such data and provides the fault-tolerant operation as described in the aforesaid Smith patent so as to produce output information identified as signals $S_A''$, $S_B''$, $S_C''$, and $S_D$, in accordance with the notation used in the previous application. Such data can then be placed on separate buses 25, 26, 27, 28 for supplying to one or more added computational processors which are required to perform whatever computational processing would be required for such data. Thus, one or more added computational processors may be utilized with respect to each channel. In the particular embodiment disclosed in FIG. 1 a single additional processor is utilized at each channel and they are identified as added computational processors 31, 32, 33, 34, respectively. The number of redundant additional processors required to be used with the original channels will depend on the degree of reliability and the total processing capacity which is required.

Thus, if the original processing performed by the fault-tolerant processor channels 21–24 requires four such processors to achieve the degree of reliability involved, all four processors can be used to perform the desired processing task. In such case the processed outputs of each of the added processors 31–34 is supplied to the core processing channels 21–24 via buses 25–28 for fault-tolerant processing as discussed in the aforementioned Smith patent. In some cases the added computational processing tasks may have a lower degree of reliability than the original fault-tolerant processing task. For example, if three such added processors are required for reliability, any three added processors, e.g., 31, 32, and 33, can be used to perform the same processing task and the processed outputs therefrom can be supplied to all of the core processors 21–24 via buses 25–27 for fault-tolerant processing as discussed above. In such case, the fourth added processor 34 can be used to perform a different computational process, if desired, on the output of core processor 24. Such computational processing operation can be performed simultaneously with the redundant operations of processors 31–33 in conjunction with core processor units 21–24, so long as such operation does not itself require redundancy.

Further, if an added processing task only requires two redundant added processors, added computational processors 31 and 32 may be utilized to perform the same task to achieve such redundancy. The processed outputs therefrom can be supplied to core processors 21–24 as above. In such a case the operations may be arranged to utilize only three core processors (e.g., processors 21–23) inasmuch as there must be at least three core processed outputs to produce a majority voted output representing the correct output. When such dual redundancy is needed (when using two added processors), the remaining unused two added processors can be used to perform two additional tasks which do not require redundancy. More specifically, if three tasks are to be performed with the output data $S_A''$, $S_B''$, $S_C''$, and $S_D''$, from the fault-tolerant processor channels A, B, C and D, respectively, one of the tasks requiring dual redundancy and the other two tasks requiring no redundancy, added processors 31 and 32 can be utilized in a redundant manner for the dual redundant task (and their processed outputs supplied to at least three of the core processors 31–34), while added processors 33 and 34 can be used for the other two non-redundant tasks simultaneously with the performance of the redundant task.

Thus, the added processing required can be flexibly arranged depending on the degree of reliability (i.e, the degree of redundancy) required for each of the tasks. If even more processing power is required, further added computational processors (not shown) can be used to communicate also with each of the buses 25–28, depending on the degree of added processing and the redundancy required for each added task. Moreover, the number of redundant channels utilized in the original tightly synchronized channels can be determined depending on the degree of overall reliability required therefor, so long as at least three are used to obtain the desired majority voting operation.

Accordingly, the system such as depicted in the example of FIG. 1 can achieve a high degree of flexibility since the number of added processors and the degree of redundancy can be selected appropriately for the overall number of tasks which are to be performed in conjunction with the basic core fault-tolerant processor units 21–24.

The computational tasks performed by the added processors can then in turn provide the further processed data which can then be supplied via buses 25–28 to the added I/O processors 41, 42, 43 and 44 for supply to suitable input/output devices via I/O channels 45, 46, 47 and 48, respectively, in accordance with conventional I/O processing techniques.

Thus, the system of the type depicted and discussed above with reference to FIG. 1 has a high degree of flexibility in arranging the amount of added processing power required for the added computational tasks involved and in terms of the degree of reliability (redundancy) thereof which is required. While the approach described with respect to FIG. 1 provides flexible reliability with respect to hardware fault tolerance, it does not necessarily, as shown, take into account software fault tolerance.

However, such system can be arranged to provide N-version software tolerance wherein the functional tasks being performed are executed in more than one way, i.e., by using different versions of software therefor. If N different versions of software are utilized to perform the same function, a system on which such N versions are used must be N-version software tolerant.

Figure 2:
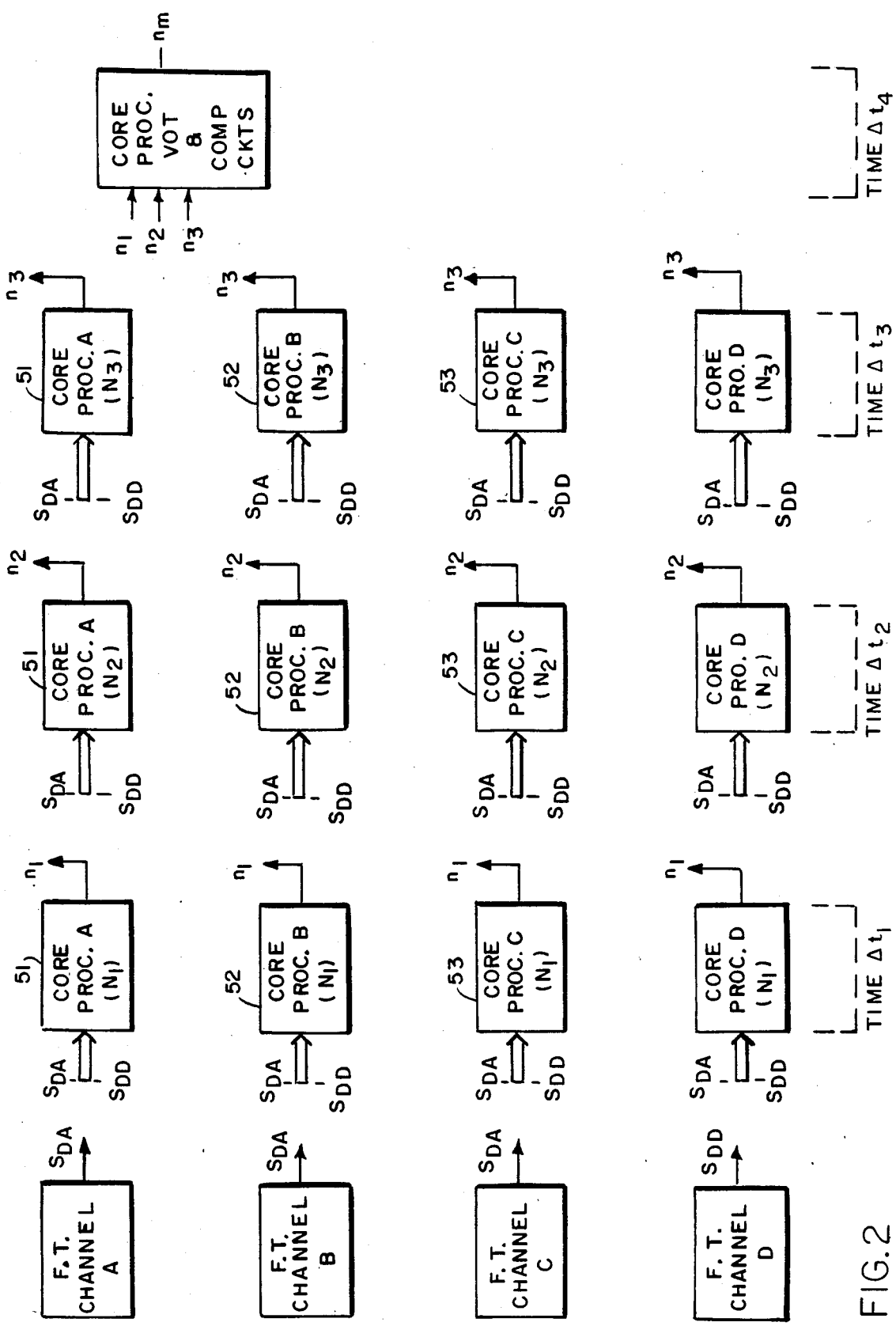
FIG. 2 shows diagrammatically a conventional redundant system for testing N-versions of software.

FIG. 2 illustrates in a diagrammatic fashion the process which is normally used for providing N-version software tolerance in connection with a plurality of hardware redundant channels. In the particular approach illustrated it is assumed that there are four redundant, fault-tolerant channels A, B, C and D identified in FIG. 2 and that there are three different versions of software for performing the same function with respect to the data from such channels, such three versions identified in FIG. 2 as versions $N_1$, $N_2$, and $N_3$.

As can be seen, in the conventional approach of FIG. 2, the data outputs from each of the fault-tolerant channels ($S_{DA}$, $S_{DB}$, $S_{SDD}$) are each supplied to each of the four processors 51, 52, 53, and 54 during a time frame $\Delta t_1$. Such processors normally are the core processors used in each of the channels A, B, C and D of a redundant channel system. During time $\Delta t_1$ each of the processors runs the first version of the software $N_1$ and provides a processed output identified in FIG. 2 for convenience as $n_1$ from each of the processors 51, 52, 53, and 54. Such results can be appropriately stored for later use.

During a second time period $\Delta t_2$ the data outputs from channels A, B, C and D are again supplied to the processors 51, 52, 53 and 54 (again the core processors associated with channels A, B, C and D), which processors are then programmed to run the second version of the software $N_2$. Such process produces the results identified as $n_2$ which results are then appropriately stored as was the case with the results $n_1$.

During a third time frame $\Delta t_3$ the same process is utilized, the processors 51, 52, 53 and 54 being programmed throughout by the third software version $N_3$ so as to produce the results identified as $n_3$. The three results $n_1$, $n_2$ and $n_3$ are then supplied to suitable voter circuitry, e.g., in the fault-tolerant redundant channels, in order to produce the desired result in the form of a voted output. The majority voted output is then supplied from the core processor voter circuits of the fault-tolerant channels A, B, C and D to provide a majority voted output identified as $n_m$. Any of the inputs which do not agree with the majority output then represent the failed software. For example, if $n_1$ and $n_3$ agree but $n_2$ does not, then the majority output $n_m$ (representing the agreed upon value of $n_1$ and $n_3$) can be used by the system with full assurance that it is both hardware and software tolerant, while the software $N_2$ which produces $n_2$ represents the failed software.

Such a system as depicted in the diagrammatic form of FIG. 2 represents a conventional approach to the use of a software fault-tolerant system. However, as can be seen, in effect the number of "computation units" required for such purpose can be represented by the product of the number of redundant channels R and the number of software versions N, so that for such a system it can be said that the number of computational units required is the product thereof, $R \times N$. Such process must be performed each time the software is checked in such a manner.

An effective technique for providing software tolerance utilizing the system described with reference to FIG. 1 can be performed in a much more efficient and less time consuming manner in accordance with the scheme described with reference to the diagrammatic description thereof in FIG. 3. As can be seen therein a plurality of fault-tolerant channels A, B, C and D provide output signals $S_{DA}$, $S_{DB}$, $S_{DC}$ and $S_{DD}$. As in FIG. 1, each of the fault-tolerant channels has added thereto one or more processors and, in the specific example discussed, three such processors are identified in FIG. 3 as added processor 61 associated with channel A, added processor 62 associated with channel B, and added processor 63 associated with channel C.

In accordance with the technique of the invention, each of the added processors is programmed to run, simultaneously with the others, a different version of the N-version software involved. In this case where there are four redundant channels and three different software versions, added processor 61 is programmed to run software $N_1$, added processor 62 is programmed to run software $N_2$, and added processor 63 is programmed to run software $N_3$.

Such processors then produce the processed outputs $n_1$, $n_2$, and $n_3$, respectively, during a first time period $\Delta t_1$ in response to input information supplied from its corresponding redundant processor period. Thus, added processor 61 responds to input information $S_{DA}$ from F.T. channel A, processor 62 responds to $S_{DB}$ from F.T. channel B, and processor 63 responds to $S_{DC}$ from F.T. channel C. Such processed outputs are then supplied to the core processor voter and comparator circuits (represented by block 64) of all of the redundant channels A, B, C and D during the time period $\Delta t_2$. Such operation produces a majority voted output $n_m$, all unfailed outputs corresponding to $n_m$. If there is a failed output, in accordance with the technique of FIG. 3, it is not possible to determine immediately whether such failed output is due to hardware failure (in the redundant channel or added processor hardware) or to software failure. Despite the inability at that stage to determine how the failure has occurred, the majority voted output $n_m$ can still be used by the system since it will clearly be the desired correct output value.

Figure 3:
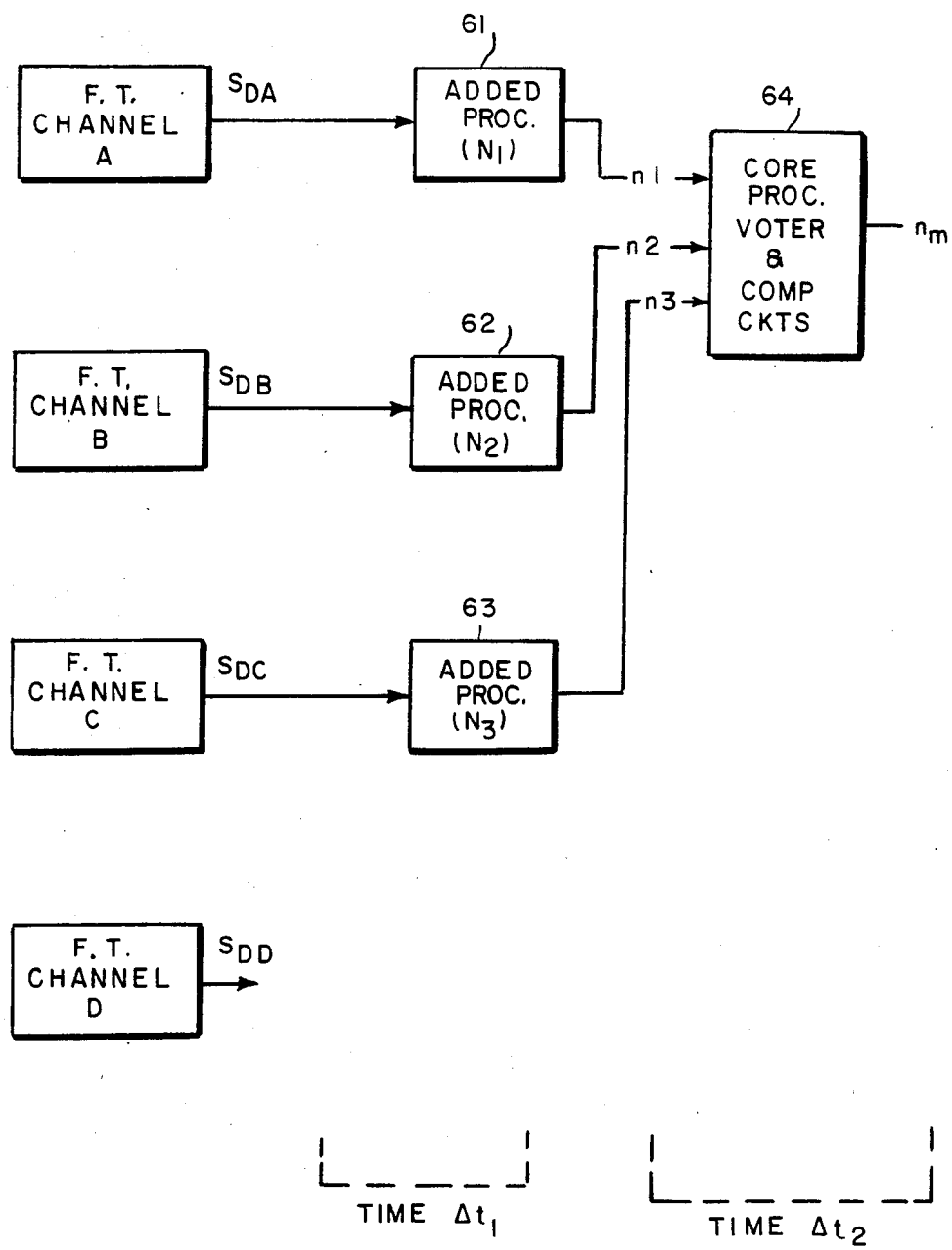
FIG. 3 shows diagrammatically a redundant system for testing N-versions of software in accordance with the invention.

In the system of FIG. 3, in order to determine whether or not the failed output is due to hardware or software failure two approaches can then be used in order to isolate the fault. One approach is to use a specially designed diagnostic program and to run such diagnostic program on the redundant channel hardware and the added processor hardware to determine if and where the fault lies in the hardware sense. If no fault is shown to occur in the hardware, then it can be concluded that the failed output is due to software failure, i.e., a failure of the software which produced the output which failed to correspond to the majority voted output $n_m$.

An alternative approach would be to utilize the following technique with reference to FIG. 3. In accordance therewith the software in a processor associated with the failed output is interchanged with the software in a processor whose output has not failed. For example, if $n_2$ has been shown to have failed then the software $N_2$ in added processor 62 is then utilized in added processor 61, while the software $N_1$ in added processor 61 is utilized in processor 62 and the process discussed with reference to FIG. 3 is repeated. If the same output still fails (e.g., $n_2$), it can be concluded that the failure has been due to software. If, on the other hand, the previously unfailed software output fails the second test, it can be concluded that the failure is in the hardware associated therewith.

Although the latter processes, using either a specially designed diagnostic program for the hardware or repeating the software tolerant process using interchanged software, requires a further somewhat extended time period for performing the processes involved, it should be realized that a hardware or software failure normally occurs only rarely. Accordingly, such added processing and hence such added time, is also required only very rarely. For example, if, in a redundant system of the type described, a failure occurs once every 10,000 hours (a realistic estimate) the additional processing required to isolate the failure need only be used once every 10,000 hours rather than at each computation process. Such operation can be contrasted with the conventional approach of FIG. 2 in which the time periods involved for determining and isolating hardware or software failures must occur each time a computational process occurs using N-version software. It is clear that substantially more processing must be performed by the system of FIG. 2 than that of FIG. 3 and that, because processing occurs in parallel in FIG. 3 rather than sequentially as in FIG. 2, less overall processing time is required for the technique of FIG. 3. As a result the technique of FIG. 3 is far more efficient in terms of both processing power and time than that of previously used conventional N-version software fault-tolerant systems.

What is claimed is:

1. An information handling system comprising
a plurality of redundant information handling processor channels operating in tight synchronism and each said channel including means for receiving input information from a source associated with said channel and for transmitting said input information to all others of said redundant channels and voting means responsive to said input information and to the input information received from said other channels for providing voted output information in ech channel, the output information in all unfailed channels being identical;
a plurality of additional processors, each said channel having one or more of said additional processors connected thereto for further processing the voted output information from said channel, the processed output information from said one or more additional processors of a selected number of said channels being supplied to said plurality of redundant processor channels, the voting means thereof providing voted processed output information in each channel.

2. An information handling system in accordance with claim 1 wherein
the processed output information from said one or more additional processors of a first selected number of said channels is supplied to said plurality of redundant processor channels, the voting means thereof providing voted processed output information from said redundant processor channels; and
processed output information from one or more additional processors of a second selected number of said channels is made available without being supplied to said redundant processor channels.

3. An information handling system in accordance with claim 2 wherein the processed output information from the additional processor of said first selected number of channels is supplied to at least three of said redundant processor channels.

4. An information handling system in accordance with claim 1, each of said redundant processor channels further including input/output processors connected thereto and to the additional processors thereof for supplying information from said input/output devices to said redundant processor channels and the additional processors thereof.

5. An information handling system in accordance with claim 4 wherein said redundant processor channels, said additional processors thereof, and said input-/output processors thereof are connected by bi-directional bus means.

6. An information handling system in accordance with claim 1 wherein said redundant processor channels and said additional processors thereof are connected by bi-directional bus means.

7. An information handling system in accordance with claim 1 wherein the added processors of a selected number of said channels are each arranged to perform the same processing operation on input information from a corresponding redundant processor channel using a different version of software to provide processed output information from the added processors of each of said selected channels;
means for supplying the processed output information from each of said selected channels to said redundant processor channels, the voting means of said redundant processor channels being responsive thereto for providing majority voted processed output information, the voted processed output information in all unfailed channels being substantially identical to said majority voted processed output information.

8. An information handling system in accordance with claim 7 wherein said same processing operation is performed on the added processors of each of said selected number of channels substantially simultaneously.

9. An information handling system in accordance with claim 7 wherein the processed output information in a failed channel is not substantially identical to said majority voted processed output information and further including
means for separately testing the operations of each said redundant processor channels and the added processors of each selected channel to determine if the failed channel has resulted from failure of the hardware in a redundant processor channel or in an added processor of a selected channel.

10. An information system in accordance with claim 7 wherein the processed output information in a failed channel is not substantially identical to said majority voted processed output information and further wherein the software version in an added processor of said failed channel is interchanged with the software version in an added processor of an unfailed selected channel and the added processors of said selected number of channels perform said same processing operation to provide processed output information from each selected channel, and
said processed output information is supplied to said redundant processor channels, the voting means thereof providing voted majority processed output information to determine whether the processed output information from the added processor of the selected unfailed channel is or is not substantially identical to said majority processed output information.

* * * * *